United States Patent
Ozawa et al.

(10) Patent No.: US 9,336,917 B2
(45) Date of Patent: May 10, 2016

(54) X-RAY APPARATUS, METHOD OF USING THE SAME AND X-RAY IRRADIATION METHOD

(75) Inventors: Tetsuya Ozawa, Hino (JP); Ryuji Matsuo, Kunitachi (JP); Licai Jiang, Rochester Hills, MI (US); Boris Verman, Bloomfield, MI (US); Kazuhiko Omote, Akiruno (JP)

(73) Assignee: RIGAKU CORPORATION, Tokyo (JP)

( * ) Notice: Subject to any disclaimer, the term of this patent is extended or adjusted under 35 U.S.C. 154(b) by 456 days.

(21) Appl. No.: 13/142,787

(22) PCT Filed: Jun. 30, 2010

(86) PCT No.: PCT/JP2010/061198
§ 371 (c)(1),
(2), (4) Date: Jul. 14, 2011

(87) PCT Pub. No.: WO2011/002037
PCT Pub. Date: Jan. 6, 2011

(65) Prior Publication Data
US 2011/0268252 A1 Nov. 3, 2011

(30) Foreign Application Priority Data
Jul. 1, 2009 (JP) .................................. 2009-157326

(51) Int. Cl.
*G21K 1/06* (2006.01)
*G01J 3/12* (2006.01)
*B82Y 10/00* (2011.01)

(52) U.S. Cl.
CPC ... *G21K 1/06* (2013.01); *G01J 3/12* (2013.01); *G21K 1/062* (2013.01); *B82Y 10/00* (2013.01); *G21K 2201/064* (2013.01)

(58) Field of Classification Search
CPC .................. G21K 1/06; G01J 3/08; G01J 3/12
USPC ............... 378/82–85, 91, 114–116, 145, 204, 378/205, 210; 356/331–333; 359/615, 634, 359/722, 204.4, 487.04, 589
See application file for complete search history.

(56) References Cited

U.S. PATENT DOCUMENTS 2,735,330 A * 2/1956 Polster .......................... 356/332
2,741,941 A * 4/1956 Madsen et al. ................. 356/321
(Continued)

FOREIGN PATENT DOCUMENTS

CN 101093200 A 12/2007
DE 1124720 B 3/1962
(Continued)

OTHER PUBLICATIONS

Monochromator definition, listed online at http://en.wikipedia.org/wiki/Monochromator.*
(Continued)

*Primary Examiner* — Anastasia Midkiff
(74) *Attorney, Agent, or Firm* — Birch, Stewart, Kolasch & Birch, LLP (57) ABSTRACT

An X-ray apparatus that creates a virtual source having a narrow energy bandwidth and enables a high-resolution X-ray diffraction measurement; a method of using the same; and an X-ray irradiation method are provided. An X-ray apparatus 100 includes a monochromator 105 that focuses a divergent X-ray beam while dispersing it and a selection part 107 that is installed in a condensing position of the condensed X-ray beam for selecting an X-ray beam having a wavelength in a specific range, allowing it to pass through, and creating a virtual source. With this arrangement, it is possible to create a virtual source having a narrow energy bandwidth at a focal point 110 and by means of the virtual source a high-resolution X-ray diffraction measurement is available. By using the X-ray apparatus 100, it is possible to sufficiently separate an X-ray beam having such an extremely narrow energy bandwidth as, for example, Kα1 ray from Kα2 ray. In addition, it is also possible to cut out part of continuous X-ray beams to create a virtual source.

12 Claims, 8 Drawing Sheets

(56) References Cited

U.S. PATENT DOCUMENTS

| | | | | |
|---|---|---|---|---|
| 2,995,973 | A * | 8/1961 | Barnes et al. | 356/331 |
| 3,460,892 | A * | 8/1969 | Dolin | 356/308 |
| 3,628,040 | A * | 12/1971 | Schnopper et al. | 378/82 |
| 4,274,000 | A | 6/1981 | Goebel | |
| 4,364,122 | A | 12/1982 | Wolfel et al. | |
| 4,649,557 | A * | 3/1987 | Hornstra et al. | 378/84 |
| 6,128,364 | A * | 10/2000 | Niemann | 378/43 |
| 6,226,347 | B1 * | 5/2001 | Golenhofen | 378/45 |
| 6,226,349 | B1 | 5/2001 | Schuster et al. | |
| 6,697,454 | B1 * | 2/2004 | Nicolich et al. | 378/85 |
| 6,807,251 | B2 * | 10/2004 | Okanda et al. | 378/71 |
| 6,829,327 | B1 * | 12/2004 | Chen | 378/44 |
| 6,870,896 | B2 | 3/2005 | Protopopov | |
| 7,039,158 | B1 * | 5/2006 | Janik et al. | 378/45 |
| 7,116,754 | B2 | 10/2006 | Lischka et al. | |
| 7,412,030 | B1 | 8/2008 | O'Hara | |
| 7,801,272 | B2 | 9/2010 | Toraya | |
| 2002/0186811 | A1 * | 12/2002 | Weiss et al. | 378/34 |
| 2004/0066894 | A1 | 4/2004 | Holz et al. | |
| 2005/0195941 | A1 | 9/2005 | Lischka et al. | |
| 2007/0025511 | A1 * | 2/2007 | Sherman | 378/84 |
| 2009/0086921 | A1 | 4/2009 | Toraya | |

FOREIGN PATENT DOCUMENTS

| | | |
|---|---|---|
| DE | 29 07 160 C2 | 2/1979 |
| DE | 29 33 047 A1 | 2/1981 |
| DE | 34 42 061 A1 | 5/1986 |
| DE | 198 33 524 A1 | 2/2000 |
| DE | 101 07 914 A1 | 9/2002 |
| EP | 1 571 441 A1 | 9/2005 |
| EP | 2 042 860 A2 | 4/2009 |
| GB | 2 181 630 B | 5/1985 |
| JP | 8-313458 A | 11/1996 |
| JP | 10-318945 A | 12/1998 |
| JP | 2004-333131 A | 11/2004 |
| JP | 2009-2805 A | 1/2009 |
| WO | WO 95/22758 A1 | 8/1995 |
| WO | WO 2006/022333 A1 | 3/2006 |

OTHER PUBLICATIONS

Wittry, David B., et al., "X-ray Crystal Spectrometers and Monochromators in Microanalysis", 2001, Microscopy Society of America, Microscopy and Analysis vol. 7, pp. 124-141.*

Klug, et al. "X-Ray Diffraction Procedures", 1974, pp. 222-232.

Kazuyuki Tohji et al. "Double-crystal spectrometer for laboratory EXAFS spectroscopy", Review of Scientific Instruments, AIP, Melville, NY, US vol. 59, No. 7, Jul. 1, 1988, pp. 1127-1131, XP-001413624.

Yukio Takano et al. "A Modifiction for X-Ray Diffraction Topography of Oscillating Method Using Monochromatic Divergent Beams", Japanese Journal of Applied Physics, vol. 13, No. 9, Sep. 1, 1974, pp. 1335-1338. XP-001415296.

* cited by examiner

X-RAY APPARATUS, METHOD OF USING THE SAME AND X-RAY IRRADIATION METHOD

TECHNICAL FIELD

The present invention relates to an X-ray apparatus that can measure X-ray diffraction with a high resolution, a method of using the same and an X-ray irradiation method.

BACKGROUND ART

Conventionally, there are known a parallel beam method in which a specimen is irradiated with a parallel X-ray beam and a diffracted X-ray is detected with a two-dimensional X-ray detector, and a focusing method (so-called a Bragg Brentano optical system (B-B optical system)) in which a diverging beam is applied to a specimen and a diffracted X-ray concentrated on a focal circle is detected with a zero-dimensional or one-dimensional x-ray detector. When these methods are used to perform measurements, each optical system needs to be configured, and separate apparatuses are basically used. To overcome this problem, there is proposed an apparatus that can perform measurements based on both the parallel beam method and the focusing method (for example, see patent document 1).

There is also proposed an apparatus that collects X-rays emanated from an X-ray source on one spot on a specimen with a Johansson crystal so as to collect and apply an X-ray beam on a narrow region on the specimen, and that measures X-ray diffraction from the spot on the specimen (for example, see patent document 2).

RELATED ART DOCUMENTS

Patent Documents

Patent document 1: U.S. Pat. No. 6,807,251, Specification
Patent document 2: EP Patent Application Publication No. 1571441, Specification

DISCLOSURE OF THE INVENTION

Problems to be Solved by the Invention

However, the intensity of a diffracted X-ray obtained by an optical system on small spot of a specimen position is much lower than that of an optical system that irradiates a broad region at the specimen position with X-rays. On the other hand, in a general focusing method (B-B method), the angular resolution of X-ray diffraction is low. In recent years, powder X-ray diffraction has made possible crystal structure analysis, and the accuracy of the analysis has been expected to be improved. However, in order to obtain a sufficient X-ray diffraction intensity in an optical system capable of separating a narrow energy width, it is necessary to design an apparatus that achieves a broad irradiation region on a specimen, and, in order to deal with various specimens (the magnitude of X-ray absorption coefficients and the quality of crystallization of the specimen), it is necessary to switch with a parallel beam.

The present invention is designed in view of the above circumstances; the invention has an object to provide an X-ray apparatus that creates a virtual source having a narrow energy width and enables a high-resolution X-ray diffraction measurement, a method of using the same and an X-ray irradiation method.

Means of Solving the Problems (1) To achieve the above object, an X-ray apparatus according to the present invention includes: a monochromator collecting a diverging X-ray beam from an X-ray source while dispersing it; and a selection part installed in a focusing position of the focused X-ray beam, for selecting an X-ray beam having a wavelength in a specific range, allowing it to pass through and creating a virtual source. The X-ray beam passing through the selection part in this way may be directly applied to a specimen or may be shaped by a reflector. Thus, it is possible to create the virtual source having a narrow energy width, and the virtual source enables a high-resolution X-ray diffraction measurement. For example, a characteristic X-ray beam is selected and can be used as the virtual source; part of a continuous X-ray beam is cut out and can be used as the virtual source. Examples of the selection part include an aperture having an elongated hole such as a slit, a knife edge or a block.

(2) The X-ray apparatus according to the present invention further includes one or more reflectors shaping the X-ray beam having passed through the selection part. Thus, it is possible to shape the X-ray beam incident to the reflector into a parallel beam or a focusing beam.

(3) In the X-ray apparatus according to the present invention, the reflector shapes the X-ray beams having passed through the selection part and generates parallel beams. Thus, it is possible to generate the parallel beam having a high-intensity in a narrow wavelength range and perform a high-resolution X-ray diffraction measurement using the parallel beam method.

(4) In the X-ray apparatus according to the present invention, the reflector shapes the X-ray beams having passed through the selection part and generates a focused beam. Thus, it is possible to generate the focused beam having a high-intensity in a narrow wavelength range and perform a high-resolution X-ray diffraction measurement using a focusing B-B method.

(5) In the X-ray apparatus according to the present invention, the monochromator is fixed; and the reflectors can be exchanged between one that shapes an incident X-ray beam into a focused light beam and one that shapes an incident X-ray beam into parallel beams. Since the reflectors can be exchanged in this way, it is possible to use the parallel beam and the focused beam without changing the arrangement of the monochromator.

(6) The X-ray apparatus according to the present invention further includes a switching mechanism enabling switching of paths between a path that shapes an X-ray beam emitted from the virtual source into a focused beam and a path that shapes an X-ray beam emitted from the virtual source into parallel beams. Thus, it is possible to easily switch between the parallel beam and the focusing beam without changing the arrangement of the monochromator.

(7) The X-ray apparatus according to the present invention further includes a reflector that shapes an X-ray beam having passed through the selection part and generates parallel beams and a reflector that shapes an X-ray beam having passed through the selection part and generates a focused beam, as the one or more reflectors. In the X-ray apparatus, the switching mechanism enables switching of paths among a path that generates parallel beams via the reflector, a path that generates a focused beam via the reflector, and a path that generates a focused beam without the intervention of the reflector. This makes it easier to switch between the use of the reflector and the nonuse thereof and switch between the parallel beam and the focused beam.

(8) In the X-ray apparatus according to the present invention, the reflector is a multilayer mirror.

Thus, it is possible to change a grating constant according to the position of an X-ray beam incident to the reflector. It is therefore possible to adjust the grating constant to produce diffraction even when the angle of incidence is changed. Consequently, with respect to the collection of light on a specimen, it is possible to selectively extract only an X-ray beam having a specific wavelength and perform a high angular resolution measurement.

(9) The X-ray apparatus according to the present invention further includes an X-ray source generating a characteristic X-ray beam as the diverging X-ray beam. Thus, it is possible to separate with the selection part one of a dispersed characteristic X-ray beam group, create a high-intensity virtual source having a narrow energy width and perform high-resolution X-ray diffraction.

(10) In the X-ray apparatus according to the present invention, the monochromator is a Johann type monochromator or Johansson type monochromator. Thus, since a beam diffracted on the surface of the monochromator is focused on an equatorial plane (plane perpendicular to an axis), and a large divergence angle part of a diverging beam from an X-ray source can be utilized, it is possible to easily use the monochromator as an efficient spectrometer.

In a case where the monochromator is a Johansson type monochromator, when the radius of curvature of a Rowland circle C1 is assumed to be R, the surface curvature of the monochromator corresponds to the radius R, but the radius of curvature of a crystal lattice surface that contributes to the X-ray dispersion of the monochromator is twice as large as R (2R). Thus, since a beam diffracted by the monochromator is more accurately focused on the equatorial plane (plane perpendicular to an axis) as compared with a Johann type monochromator, it is preferably possible to more easily use the large divergence angle part as diverging light.

(11) The X-ray apparatus according to the present invention further includes a detector detecting an X-ray beam that has been collected by the reflector and has passed through a specimen or has been reflected from the specimen. In the X-ray apparatus, the detector has elongated unit detection regions arranged in parallel and is capable of discriminating an X-ray beam having energy between an upper limit value and a lower limit value from other beams by converting the X-ray beams received in the unit detection region into electric signals and detecting the electric signals. Thus, it is possible to perform an X-ray diffraction measurement with a high angle resolution and a high detection intensity, using a one-dimensional high-resolution detector.

(12) In a method of using an X-ray apparatus according to the present invention, the selection part separates X-ray beams having a wavelength in a specific range from other beams in the X-ray apparatus described above. By selecting Kα1 with the selection part, it is possible to create a high-intensity virtual source and perform X-ray diffraction with a high resolution.

(13) In an X-ray irradiation method according to the present invention, a monochromator collects a diverging X-ray beam while dispersing it, and an X-ray beam having a wavelength in a specific range is selected and allowed to pass through in a focusing position of the focused X-ray beam to create a virtual source. Thus, it is possible to create a virtual source having a narrow energy width, and the virtual source enables a high-resolution X-ray diffraction measurement.

EFFECT OF THE INVENTION

According to the present invention, it is possible to create a virtual source having a narrow energy width, and perform a high-resolution X-ray diffraction measurement

BEST MODES FOR CARRYING OUT THE INVENTION

Embodiments of the present invention will now be described with reference to the drawings. For clarity of the description, in the drawings, like components are identified with like reference numerals, and duplicated description will be omitted.

[First embodiment]

(Overall configuration)

Figure 1:
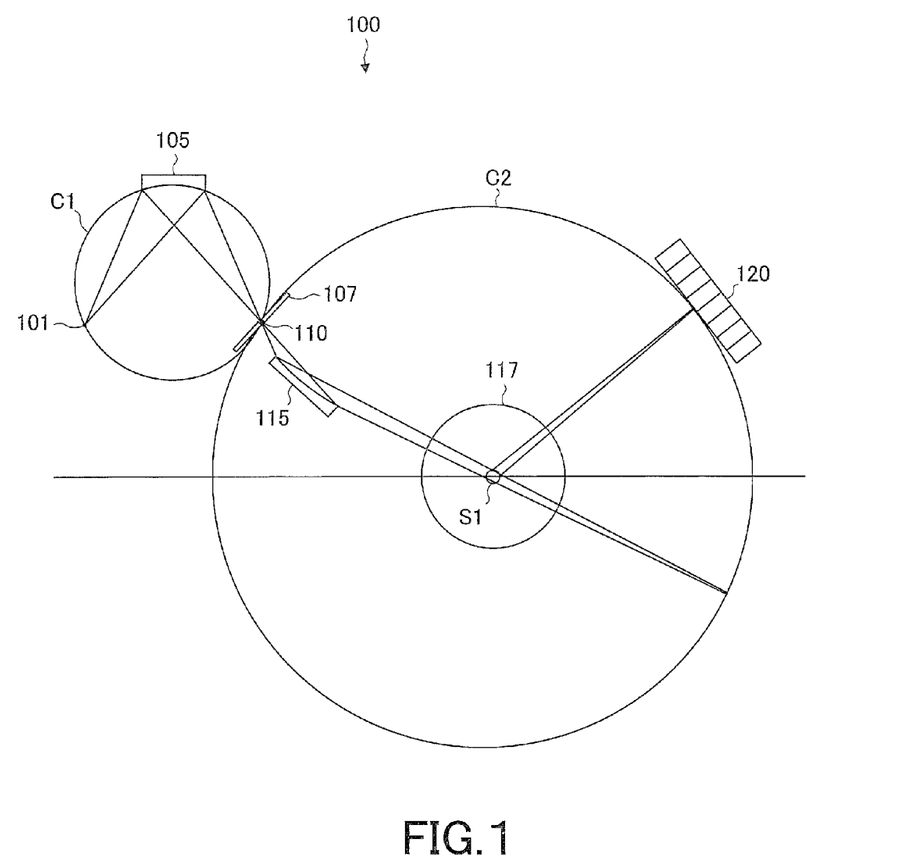
FIG. 1 is a plan view showing the configuration of an X-ray apparatus according to a first embodiment.

FIG. 1 is a schematic diagram showing the configuration of an X-ray apparatus 100. As shown in FIG. 1, the X-ray apparatus 100 includes an X-ray source 101, a monochromator 105, a slit 107, a reflector 115, a specimen stage 117 and a detector 120. Thus, it is possible to perform a measurement on a specimen S1. An example shown in FIG. 1 is an optical system that performs a transmission method using a focused beam.

The X-ray source 101 generates diverging X-ray beams. Copper can be used as an anode metal. Examples of other metals that generate characteristic X-ray beams include chromium, iron, cobalt, gallium, molybdenum, silver, tungsten and gold. When this type of anode metal is used, a high-intensity characteristic X-ray beam can be utilized as a virtual source. As characteristic X-ray beams, Kα1 and Kα2 rays, Lα1 and Lα2 rays, Lβ1, Lβ3 and Lβ4 rays and other rays attributable to the difference between energy levels of electron orbits are generated; their energies are extremely close to each other. For example, the energy of the Kα1 ray of copper is 8.0478 keV, and the energy of the Ka2 ray is 8.0280 keV; their difference is as little as $19.8 \times 10^{-3}$ keV.

The monochromator 105 collects the diverging X-ray beam while dispersing it. The monochromator 105 is arranged near the tube of the X-ray source 101. As described later, the reflector 115 can be replaced whereas the arrangement of the monochromator 105 is not changed. Thus, it is possible to easily perform the parallel beam method and the focusing method with the same device, which increases the convenience of a user.

Conventionally, there is no such optical system that creates a virtual source having a narrow energy width and can correspond to both the parallel beam method and the focusing method. A method of achieving the focusing method and the parallel beam method by preparing two systems, that is, an optical system that collects a focused light spot on a detector with a Johansson crystal having an asymmetrical focal position and an optical system that makes a focusing position an unlimited length in a pseudo way with a Johansson crystal having an asymmetrical focal position and by transferring and exchanging them is not practical as a high-precision measurement system. This is because it is extremely difficult to transfer a Johann crystal and a Johansson crystal arranged with high precision. When a system is configured with a Johann crystal or a Johansson crystal to form focal points in positions apart from each other, X-ray beams are focused insufficiently with low accuracy. With the X-ray apparatus 100, it is possible to perform a high-resolution X-ray diffraction measurement without changing the arrangement of the monochromator 105, using the parallel beam method and the focusing method.

In order to prevent a component of the Kα2 ray from being included in the focal point 110 of the Kα1 ray and acquire a predetermined X-ray intensity or more, it is preferable to use a high-precision crystal as the monochromator 105. Moreover, in order to collect the X-ray beam while dispersing it, it is preferable to use a curved crystal as the monochromator 105. Examples of the curved crystal include a Johann crystal and a Johansson crystal.

The Johann crystal and the Johansson crystal each are a crystal whose crystal lattice surface is curved to have a curvature twice as large as that of a Rowland circle C1 passing through three points, that is, an incoming side focal position (X-ray source 101), an outgoing side focal position (focal point 110) and a reflection position. The Johann crystal and the Johansson crystal are usually made of germanium or silicon. The Johansson crystal is shaped such that its surface is ground to have the curvature of the Rowland circle C1, and is free from astigmatism. Hence, a beam diffracted on the surface of the Johansson crystal is accurately focused on an equatorial plane (plane perpendicular to an axis). Since the Johansson crystal has such a characteristic, an X-ray beam having a large divergence angle is easily utilized when the Johansson crystal is used. Since the Johansson crystal is arranged with high precision, the Johansson crystal preferably does not need to be transferred or replaced when measurement conditions for an X-ray diffraction sample are changed.

The slit 107 (selection part) is installed in a focusing of the focused X-ray beam, and transmits an X-ray beam having a wavelength in a specific range. Consequently, it is possible to create a virtual source selected in the focusing position and having a narrow energy width. For example, it is also possible to separate and extract only the Kα1 ray from the characteristic X-ray beam containing the Kα1 and the Kα2 rays and use it as a virtual source. Further, a separation ray makes it possible to separate a virtual source where L series X-ray beams having similar energy differences are separated or part of a continuous X-ray beam, and to use it as a virtual source. Instead of the slit, a knife edge or a block may be used.

The reflector 115 reflects and shapes the X-ray beam that has passed through the slit (selection part). There are two types of reflector 115, one that shapes the X-ray beam that has passed through the slit into a collected light beam and the other that shapes it into a parallel light beam, and they can be selected by exchanging them. For example, the reflector 115 shown in FIG. 1 shapes an incident X-ray beam into a collected light beam. Examples of the reflector 115 suitable for generating a focusing beam include an elliptical mirror. When a focused light beam is used, a high-resolution analysis can be achieved.

As a specific example of the reflector 115, a multilayer mirror is cited. With the multilayer mirror, it is possible to change a grating constant according to the position of an X-ray beam incident to the reflector 115. Consequently, with respect to the focusing on the detector, it is possible to selectively extract only an X-ray beam having a specific wavelength and perform a high angular resolution measurement. Instead of the reflector 115, it is also possible to increase its precision by arranging a flat mirror that does not shape an incident X-ray beam; however, this is not appropriate because the intensity of the X-ray beam in this case is too low.

The specimen stage 117 supports the specimen S1, and rotates the specimen S1 about a center shaft at the time of measurement. The X-ray beam shaped by the reflector 115 is applied to the specimen S1. The specimen S1 takes a form corresponding to the application; for example, when a powder method is used, a capillary in which powder is sealed is used as the specimen S1.

Figure 2:
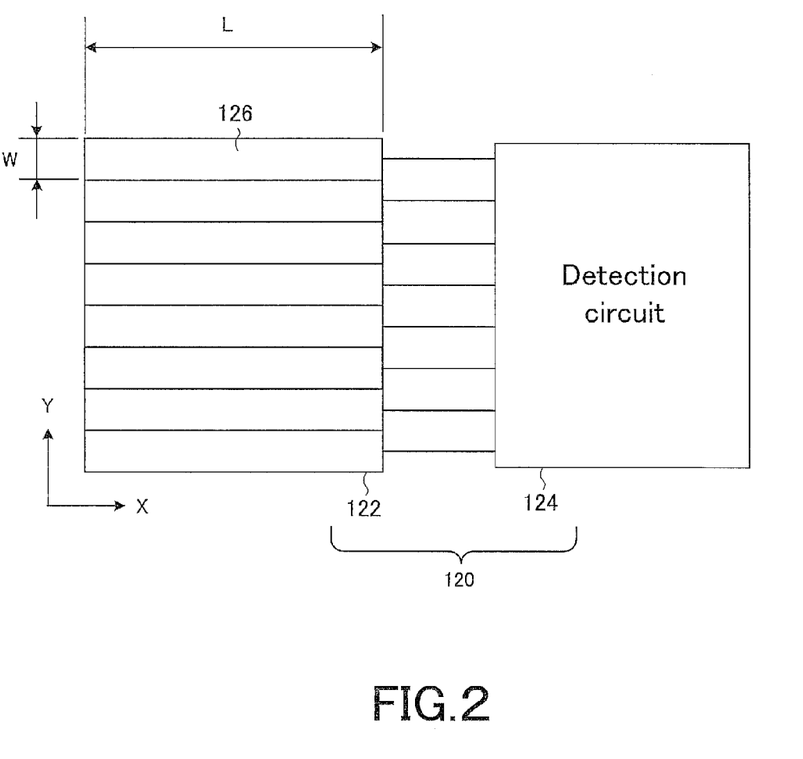
FIG. 2 is a schematic diagram showing the configuration of a detector.

The detector 120 is arranged on a focal circle C2, and detects an X-ray beam that has passed through or has been reflected from the specimen S1. The detector 120 is preferably a high-resolution one-dimensional detector. FIG. 2 is a diagram showing an example of the configuration of the detector 120. The detector 120 converts an X-ray beam received in elongated unit detection regions arranged in parallel into electric signals, and detects the electric signals to discriminate an X-ray beam having energy between an upper limit value and a lower limit value.

The detector 120 is a silicon strip detector (SSD), and includes a detection element 122 and a detection circuit 124. The detection element 122 has a plurality of elongated unit detection regions 126, and the unit detection regions 126 extend in an X-direction in the figure so as to form an elongated shape. They are about 20 mm in length L and about 0.1 mm in width W in size. These unit detection regions 126 are arranged in parallel to each other. The detector 120 is a one-dimensional position-sensitive detector that can discriminate a detection position in a Y-direction with high precision.

Each of the unit detection regions 126 is connected to the detection circuit 124. The unit detection regions 126 have the function of detecting photons of an X-ray beam one by one, and output an electric signal corresponding to the energy of the X-ray beam received. The detection circuit 124 counts only signals corresponding to the X-ray beam energy between predetermined upper and lower limit values. The predetermined upper and lower limit values can be freely set by the user. Thus, it is possible to perform a measurement with high energy resolution. As described above, the X-ray beam having an extremely narrow energy width is applied to the specimen and is diffracted, and the diffracted X-ray beam is detected with the high-resolution detector 120, which allows a high-precision measurement.

[Second embodiment]

Figure 3A:
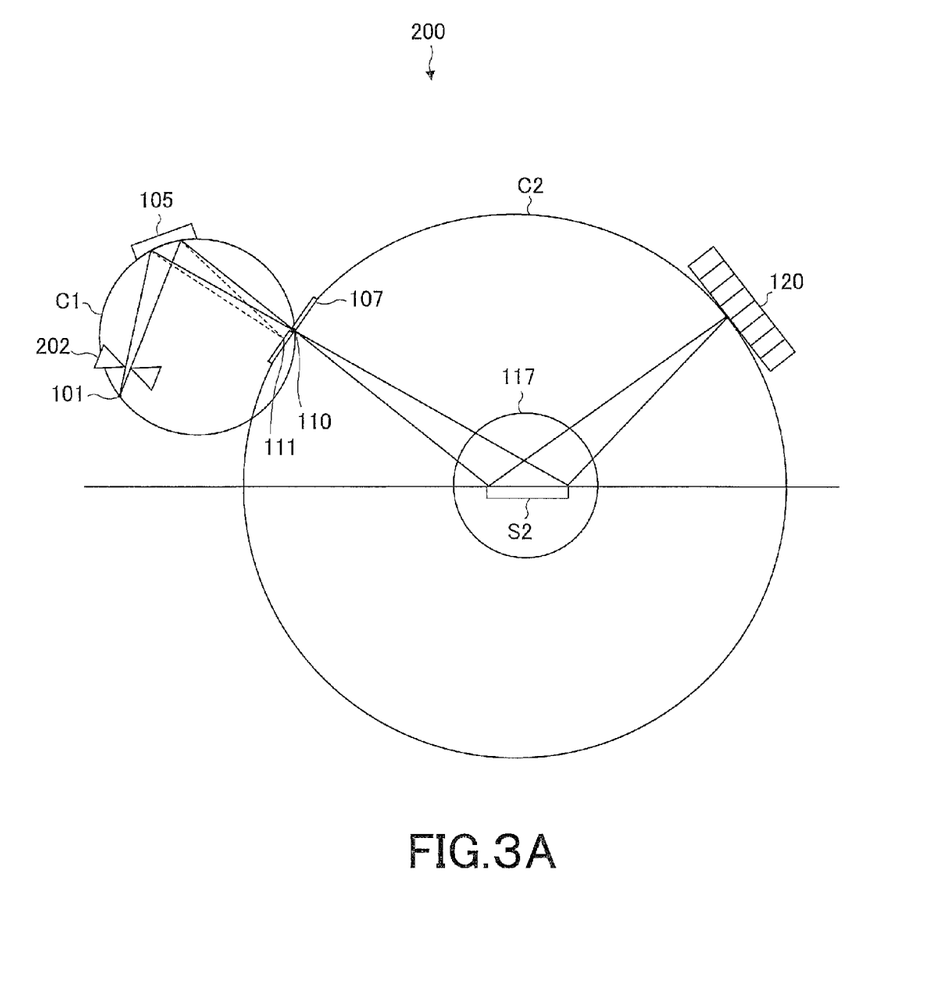
FIG. 3A is a plan view showing the configuration of an X-ray apparatus according to a second embodiment.
Figure 3B:
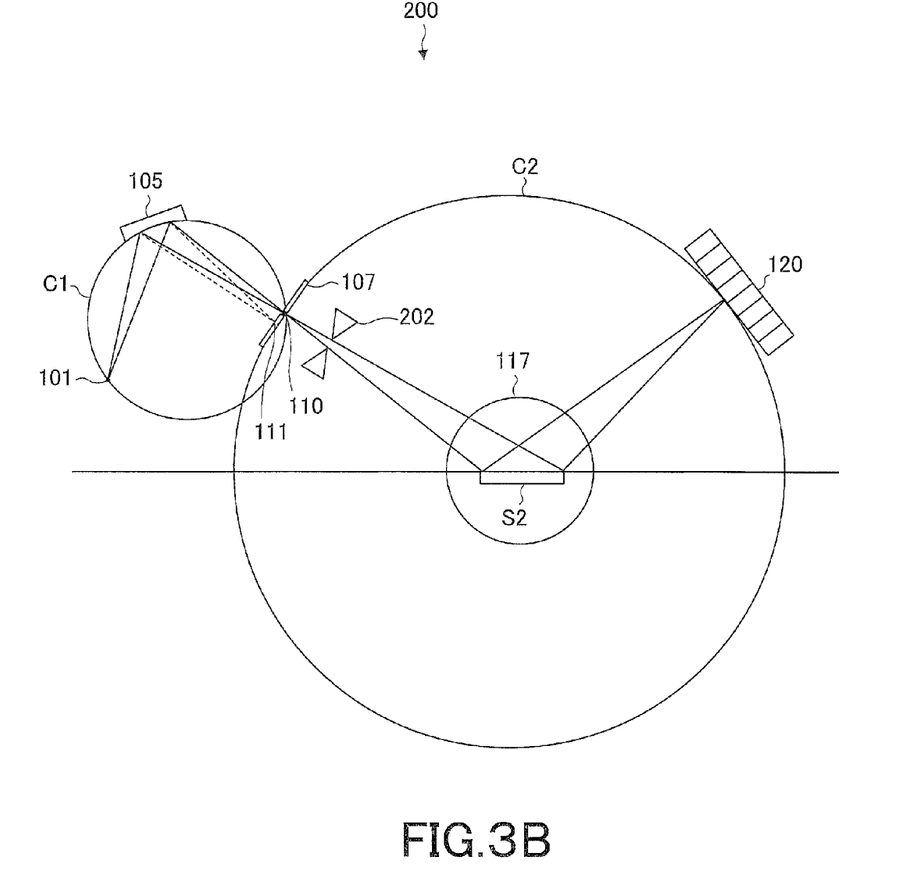
FIG. 3B is a plan view showing the configuration of an X-ray apparatus according to a variation of the second embodiment.

The embodiment described above targets the optical system that performs the transmission method using the focused beam shaped by the reflector 115; the focused beam that has passed through the slit 107 (selection part) may be directly applied to the specimen. FIG. 3A is a plan view showing the configuration of an X-ray apparatus 200 that does not use the reflector 115. FIG. 3B is a plan view showing an embodiment of a variation of the X-ray apparatus 200 shown in FIG. 3A. In the X-ray apparatus 200 shown in FIG. 3A, a slit 202 is arranged within the Rowland circle C1 whereas, in the X-ray apparatus 200 shown in FIG. 3B, the slit 202 is arranged within the focal circle C2. As shown in FIGS. 3A and 3B, the X-ray apparatus 200 includes the X-ray source 101, the slit 202, the monochromator 105, the slit 107, the specimen stage 117 and the detector 120. Thus, it is possible to perform a measurement on a specimen S2. When the size of the monochromator 105 is appropriately set, the slit 202 is not necessary. In other words, the slit 202 is not an essential component. The X-ray beam from the X-ray source 101 is reflected from the monochromator 105, and only the X-ray beam having a wavelength in a specific range passes through the slit 107. Then, the X-ray beam that has passed through the slit 107 is applied to the specimen S2, and only the X-ray reflected from the specimen S2 is detected by the detector 120. In this type of configuration, for example, when the position of the slit 107 is accurately aligned with the position of the focal point 110 of the Kα1 ray, the Kα2 ray cannot pass through the slit in the position of its focal point 111, and thus it is possible to separate the Kα1 ray from the Kα2 ray. This is true for the separation of the Kα1 ray from the Kα2 ray in the first embodiment.

[Third Embodiment]

In the embodiment described above, the incident X-ray beam is shaped into a focused beam; it is possible to shape it into a parallel light beam by replacing the reflector. In this case, with the parallel beam method, it is possible to perform structural analysis on the specimen.

Figure 4:
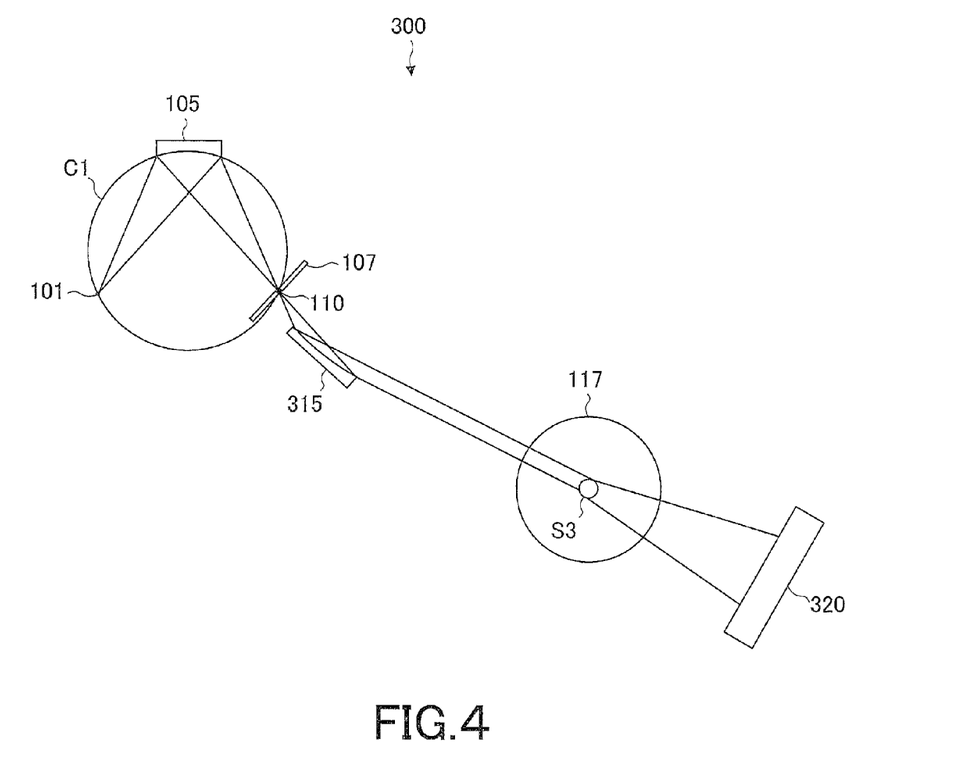
FIG. 4 is a plan view showing the configuration of an X-ray apparatus according to a third embodiment.

FIG. 4 is a plan view showing the configuration of an X-ray apparatus 300 including a reflector 315 that shapes an incident X-ray beam into a parallel beam. As shown in FIG. 4, the X-ray apparatus 300 includes the X-ray source 101, the monochromator 105, the slit 107 (selection part), the reflector 315, the specimen stage 117 and a detector 320. Thus, it is possible to perform a measurement on a specimen S3. The configuration of the device is substantially the same as that of the X-ray apparatus 100, and is different from that in the reflector 315 and the detector 320.

Figure 5:
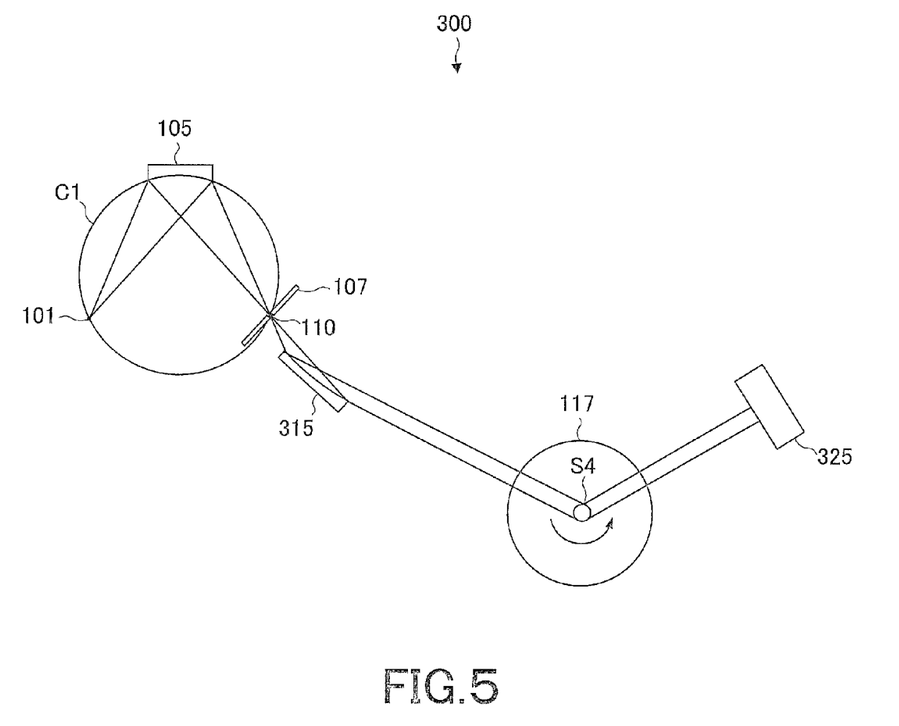
FIG. 5 is a plan view showing the configuration of the X-ray apparatus according to the third embodiment.

FIG. 5 shows the X-ray apparatus 300 when a measurement is performed with the Debye-Scherrer method. In the X-ray apparatus 300, the parallel X-ray beam shaped by the reflector 315 is applied to a specimen S4. In the X-ray apparatus 300, the X-ray beam diffracted by the specimen S4 is detected by a detector 325. It is possible to fit a crystal analyzer between the specimen and the detector 325. As the crystal analyzer, a high-intensity high-resolution crystal analyzer (CALSA) disclosed in the specification of US patent application publication No. 2009/0086921 is preferably used. As the specimen S4, a capillary in which powder is sealed is used; the specimen stage 117 is rotated about the shaft of the capillary (in a direction indicated by an arrow shown in FIG. 5).

Figure 6:
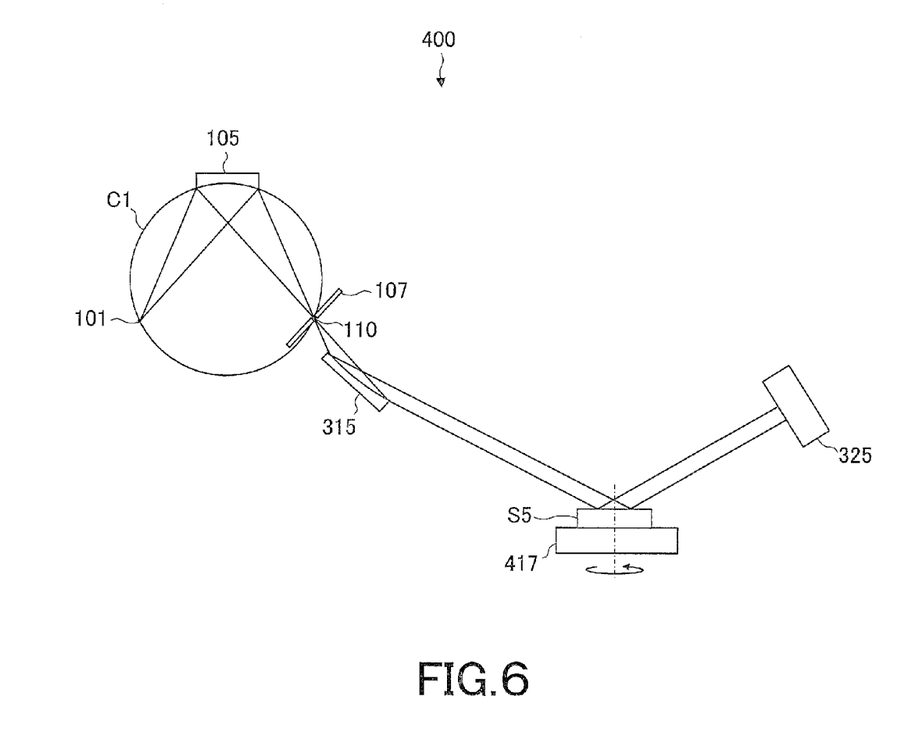
FIG. 6 is a plan view showing the configuration of the X-ray apparatus according to the third embodiment.

FIG. 6 shows an X-ray apparatus 400 when a measurement is performed with the Debye-Scherrer method using a horizontal specimen goniometer. In the X-ray apparatus 400, the parallel X-ray beam shaped by the reflector 315 is applied to a specimen S5. In the X-ray apparatus 400, the X-ray beam diffracted by the specimen S5 is detected by the detector 325. It is possible to fit the crystal analyzer between the specimen and the detector 325. As the crystal analyzer, the high-intensity high-resolution crystal analyzer (CALSA) is preferably used. As the specimen S5, a flat specimen is used. A specimen stage 417 is, for example, a horizontal goniometer; the flat specimen S5 is rotated with respect to its surface within a plane (in a direction indicated by an arrow shown in FIG. 6).

Figure 7:
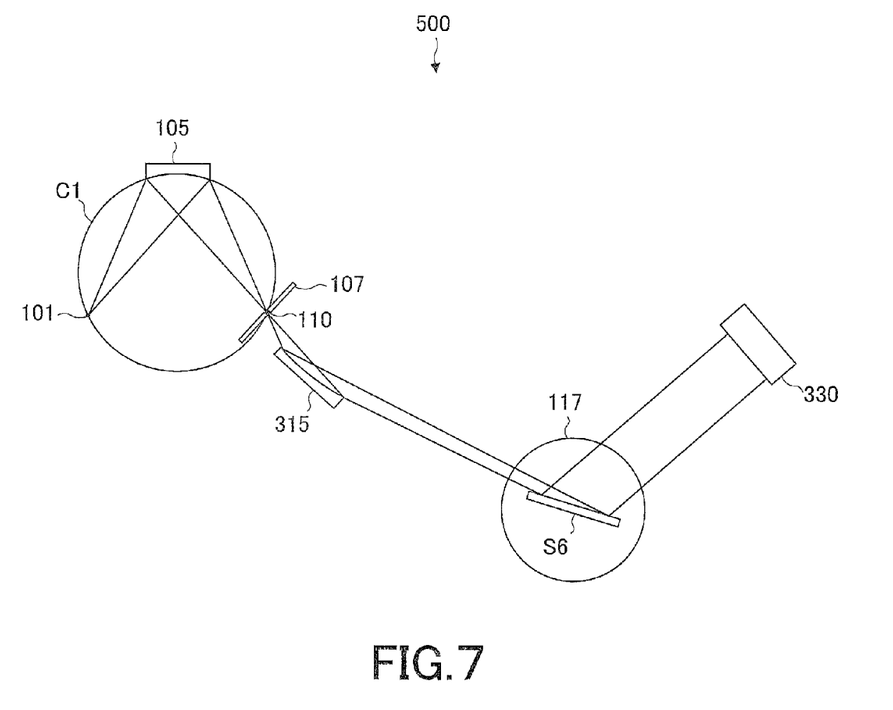
FIG. 7 is a plan view showing the configuration of the X-ray apparatus according to the third embodiment.

FIG. 7 is a plan view showing the configuration of an X-ray apparatus 500 in which a parallel light beam is applied to a thin-film specimen. As shown in FIG. 7, the configuration of the X-ray apparatus 500 is the same as that of the X-ray apparatus 200 except for a detector 330. Thus, it is possible to perform a measurement on the thin-film specimen S6. The detector 330 is a detector for the measurement of a thin film. A diverging X-ray beam emitted from the focal point 110 is shaped by the reflector 315 into the parallel beam, and the parallel beam obtained is incident to the surface of the thin-film specimen S6 in a low-angle direction. Consequently, the X-ray beam can be incident to a region having a large surface area, and thus it is possible to detect a high-intensity X-ray beam.

As described above, the X-ray apparatus of the present invention can be used for the structural analysis of a powder specimen or a thin-film specimen, and can be utilized in various ways according to the purpose of the user. It is also possible to easily switch between a high-resolution B-B method using the Kα1 ray, a parallel beam method using a paraboloid mirror, a transmission Debye-Scherrer camera method utilizing an elliptical focusing mirror and other methods without changing the optical system and the position of the specimen.

It is also possible to measure high-resolution powder X-ray diffraction effective for powder structural analysis and Rietveld analysis with a relatively high intensity. In a reflection method, for a light element (organic crystal) specimen where the resolution is lowered, a beam can be collected on a detector, and a transmission optical system using a capillary can also be used. It is also possible to easily utilize a high-precision grating constant measurement (temperature change) with the parallel beam method.

In the above embodiments, the configuration using the reflector and the configuration using no reflector are described as separate configurations; the X-ray apparatus may have a switching mechanism such that it is possible to switch between an X-ray path through which an X-ray beam is applied via the reflector and an X-ray path through which an X-ray beam is applied without the intervention of the reflector in the same apparatus. With respect to the reflector, it is also possible to switch between an X-ray path through a reflector for shaping into a parallel beam and an X-ray path through a reflector for shaping into a focused beam. As this type of X-ray path switching mechanism, there is a mechanism that selects an X-ray path by opening and closing, for example, a slit.

DESCRIPTION OF SYMBOLS 100, 200, 300, 400 and 500 X-ray apparatus
101 X-ray source
105 Monochromator
107 Slit (selection part)
110 Focal point
111 Focal position of Kα2
115 and 315 Reflector
117 and 417 Specimen stage
120, 320, 325 and 330 Detector
122 Detection element
124 Detection circuit
126 Unit detection region
202 Slit
C1 Rowland circle
C2 Focal circle
S1 to S6 Specimen

The invention claimed is:
1. An X-ray apparatus comprising:
a monochromator that takes a divergent X-ray beam and focuses the X-ray beam while monochromating;

a selection part installed at a focused position of said monochromated X-ray beam, for selecting a specific wavelength in a narrow range, and creating a virtual source; and one or more reflectors coordinating the selected specific wavelength having passed through said selection part.

2. The X-ray apparatus according to claim 1, wherein said one or more reflectors coordinate the selected specific wavelength having passed through said selection part and forms parallel beams.

3. The X-ray apparatus according to claim 1, wherein said one or more reflectors coordinate the selected specific wavelength having passed through said selection part and forms a focused beam.

4. The X-ray apparatus according to claim 1, wherein:
said monochromator is fixed; and
said reflectors can be exchanged between one that coordinates an incident specific wavelength into a focused beam and one that coordinates an incident specific wavelength into parallel beams.

5. The X-ray apparatus according to claim 1, further comprising a switching mechanism enabling switching of paths between a path that coordinates an X-ray beam emitted from said virtual source into a focused beam and a path that coordinates an X-ray beam emitted from said virtual source into parallel beams.

6. The X-ray apparatus according to claim 5, comprising a reflector that coordinates an X-ray beam having passed through said selection part and forms parallel beams and a reflector that coordinates an X-ray beam having passed through said selection part and forms a focused beam, as said one or more reflectors, wherein
said switching mechanism enables switching of paths among a path that forms parallel beams via said reflector, a path that forms a focused beam via said reflector, and a path that forms a focused beam without the intervention of said reflector.

7. The X-ray apparatus according to claim 1, wherein said reflector is a multilayer mirror.

8. The X-ray apparatus according to claim 1, further comprising an X-ray source generating a characteristic X-ray beam as said divergent X-ray beam.

9. The X-ray apparatus according to claim 1, wherein said monochromator is a Johann type monochromator or Johansson type monochromator.

10. The X-ray apparatus according to claim 1, further comprising a detector detecting an X-ray beam that has been focused by said reflector and has passed through a specimen or has been reflected from the specimen, wherein
said detector has elongated unit detection regions arranged in parallel and is capable of discriminating an X-ray beam having energy between an upper limit value and a lower limit value from other beams by converting the X-ray beams received in said unit detection region into electric signals and detecting said electric signals.

11. A method of using an X-ray apparatus, wherein said selection part passes a specific wavelength and prevents other wavelengths from passing in the X-ray apparatus according to claim 7.

12. An X-ray irradiation method, wherein:
a monochromator takes a divergent X-ray beam and focuses the X-ray beam while monochromating; and
a specific wavelength in a narrow range is selected at a focused position of said monochromated X-ray beam, and used to create a virtual source; and
coordinating the selected specific wavelength by one or more reflectors.

\* \* \* \* \*